Aug. 3, 1926.

H. DAVIS 1,594,930

SWIVEL

Filed April 20, 1925

Inventor

Howard Davis

By E. C. Brandenburg

Attorney

Patented Aug. 3, 1926.

1,594,930

UNITED STATES PATENT OFFICE.

HOWARD DAVIS, OF OTTAWA, KANSAS.

SWIVEL.

Application filed April 20, 1925. Serial No. 24,713.

My invention relates to an improvement in swivels.

The object is simplicity in manner of construction, economy in cost, and effectiveness in operation.

The present invention consists of a pipe or tube cut away on the sides to form two jaws, and having one end notched and bent in or upset to form a cup to receive ball-bearings, and the shank of an eye-bolt forming part of the swivel.

In the accompanying drawings:—

Figure 1:
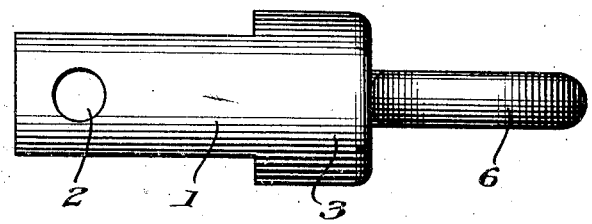
Figs. 1 and 2 are side elevations taken at right-angles to each other.
Figure 2:
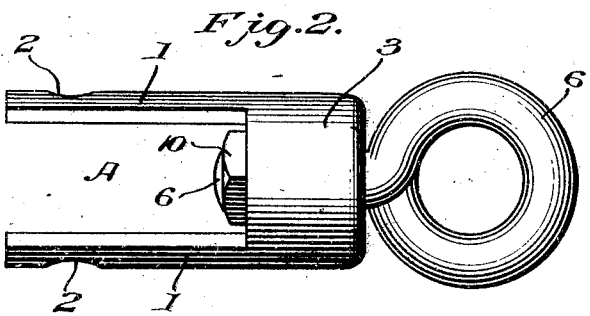

A, represents the solid frame of the swivel. This is preferably made from a piece of iron pipe or tubing of the desired length having the opposite sides cut away, as shown in Figs. 1 and 2, to form the two oppositely-disposed jaws 1 which are adapted to span or embrace the part to which the swivel is attached by means of a bolt (not shown) passing through the holes 2 in the jaws.

Figure 4:
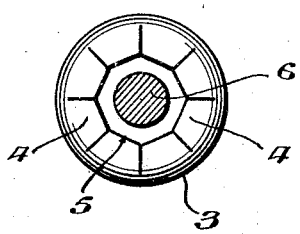
Fig. 4 is a section on the line 4—4 of Fig. 3.

One portion is left in its original tubular form as shown at 3, forming a cylindrical body, and the extreme ends of the pipe or tube are notched, and the projections 4 left by the notches are bent inwardly or upset, as viewed in Fig. 4, leaving the orifice 5 in the center.

Figure 3:
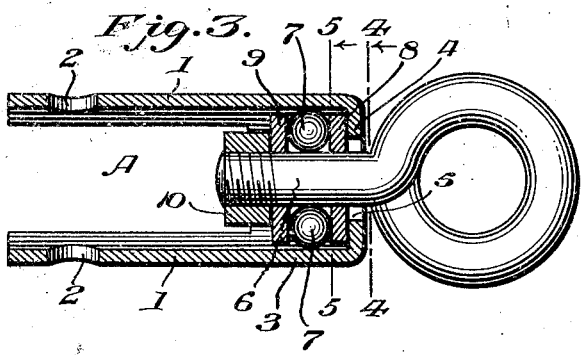
Fig. 3 is a longitudinal section.
Figure 5:
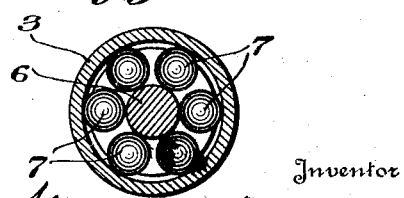
Fig. 5 is a section on the line 5—5 of Fig 3.

An eye bolt 6 extends through this orifice 5, and ball-bearings 7 are held between the two washers 8 and 9. The shank of the eye-bolt passes through the orifice 5 and through the washers and between the balls (as viewed in Figs. 3, 4 and 5), and has a nut 10 screwed on the threaded end to hold the parts assembled.

Thus all parts are made from stock material, and in number they are reduced to a minimum. They are easily assembled and retained in place, and the swivel thus constructed is effective and efficient in the performance of its functions.

I claim:—

1. A swivel including a tubular frame having cut-out side portions adjacent an end thereof and having the opposite end thereof notched and bent inwardly substantially at right angles to the longitudinal axis to form a partially closed end, and a swivel bolt received in said partially closed end.

2. A swivel including a tubular frame partially closed at one end to form a central orifice, an eye bolt inserted and held therein, washers and interposed ball bearings surrounding the shank of the eye bolt, and means on the shank of the eye bolt to retain it rotatably within the orifice, the opposite end of the frame cut away on opposite sides to form a pair of oppositely disposed jaws, said jaws having holes therein to receive a fastening bolt.

3. A swivel including a frame or pipe having a portion of the opposite sides of the pipe cut away, and one end notched and bent inwardly or upset forming a central orifice, an eye-bolt extending through the orifice, a pair of washers through which the shank of the eye-bolt extends, ball-bearings confined between the washers, and means secured on the inner end of the eye-bolt to hold the parts together.

4. A swivel including a tubular frame having cut-out side portions adjacent one end thereof, and having the opposite end thereof notched and bent inwardly substantially at right angles to the longitudinal axis of the frame to form a partially closed end, a swivel bolt extending into said partially closed end, washers fitted over said bolt, ball bearings interposed between the washers, and means connected with the outer end of the bolt for holding the washers thereon, one of said washers abutting against the inwardly bent end to hold the bolt in place.

In testimony whereof I affix my signature.

HOWARD DAVIS.